Dec. 2, 1969               O. BALDI            3,481,578
ELECTROMAGNETIC VALVE WITH AXIAL PLAY BETWEEN
THE STEM AND PERMANENT MAGNET HOLDING MEANS
Filed Nov. 2, 1967
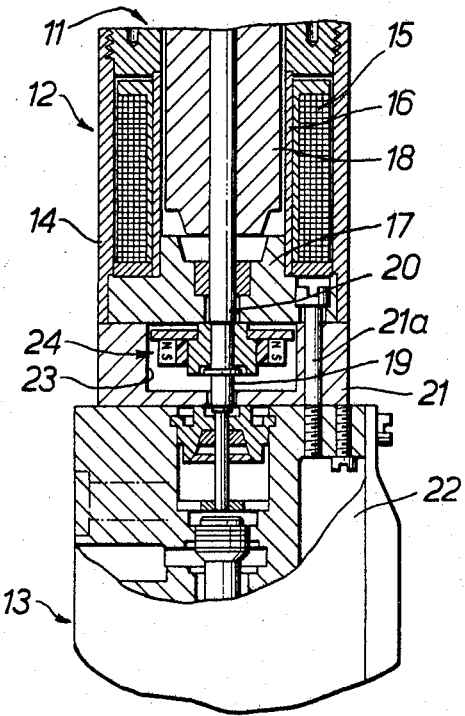
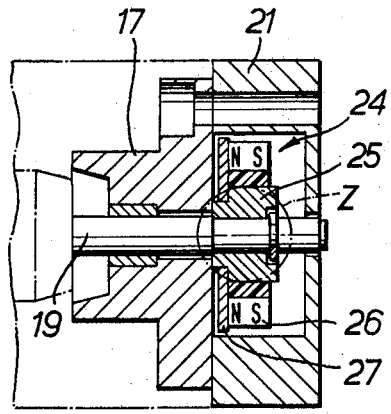
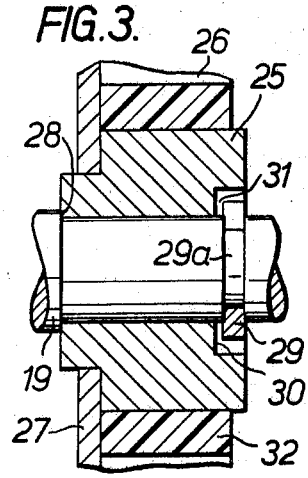
INVENTOR:
OTELLO BALDI
BY    *Malan & Molle*
ATTORNEYS __United States Patent Office__

3,481,578
Patented Dec. 2, 1969

3,481,578
ELECTROMAGNETIC VALVE WITH AXIAL PLAY BETWEEN THE STEM AND PERMANENT MAGNET HOLDING MEANS
Otello Baldi, Korb, near Waihlingen, Germany, assignor to Erich Herion Sen., Stuttgart, Germany
Filed Nov. 2, 1967, Ser. No. 680,095
Claims priority, application Germany, Nov. 5, 1966, H 60,936
Int. Cl. F16k 31/08, 31/02
U.S. Cl. 251—65  6 Claims

ABSTRACT OF THE DISCLOSURE

An electromagnetically operable valve having an armature, a valve stem connected to the armature, and a permanent magnet mounted on the stem for holding the same in a certain position with respect to the housing of the valve, the permanent magnet having an axial play with respect to the valve stem to permit axial movement therebetween and subject the permanent magnet only to the force of its own inertia when the valve stem impacts upon the housing during opening and closing of the valve.

BACKGROUND OF THE INVENTION

The present invention relates to a valve operated electromagnetically by an impulse, for pressure medium operable systems, especially hydraulic systems, said valve including a permanent magnet which holds a valve rod or valve linkage fixedly connected to the armature of the electro magnet in a certain position of the valve.

Such valves are generally known. Normally, the armature is fixedly connected to the permanent magnet. The drawback of such a valve consists in that the permanent magnet impacts during each reversing movement of the magnetic armature with the total inertia of the armature, of the valve stem or linkage, and of its own mass upon its effective or holding surface. The forces created during such impact will soon lead to the destruction of the permanent magnet, especially when a sintered oxide magnet is employed. In order to avoid the destruction, it has already been suggestted to provide a gap between the permanent magnet and its holding or effective surface which, however, requires the use of a larger permanent magnet. Aside from the fact that these larger permanent magnets are more expensive, they require more space and increase the total weight of the magnetic valve.

It is, therefore, an object of the present invention to provide an electromagnetic valve which will overcome the above mentioned drawbacks of the heretofore known valves.

It is still another object of the present invention to provide a magnetic valve which requires only a small permanent magnet while this permanent magnet is, nevertheless, protected against high and non-permissible shock-like forces.

These and other objects and advantages of the present invention will appear more clearly from the following specification in connection with the accompanying drawings in which:

FIG. 1 is a section through an electro-magnetic valve according to the present invention;

FIG. 2 shows the permanent magnet of the valve, on a larger scale than FIG. 1;

FIG. 3 shows a portion of FIG. 2 on a still larger scale.

BRIEF SUMMARY OF THE INVENTION

The problems underlying the present invention have been solved by an electro-magnetic valve in which the permanent magnet carried by the valve stem or valve linkage has an axial play of a certain magnitude with regard to the valve linkage or valve stem.

According to another feature of the present invention, the permanent magnet is detachably held on the valve stem or valve linkage so that the permanent magnet may be easily exchanged or replaced, if necessary.

DETAILED DESCRIPTION OF A PREFERRED EMBODIMENT

Referring now to the drawing in detail, the electromagnetic valve 11 shown in FIG. 1 comprises an electromagnet generally designated with reference numeral 12, and a valve 13. Electro-magnet 12 includes a sleeve-like housing 14, a magnetic coil 15, and an inner sleeve 16 which is carried by a flange 17. A magnetic armature 18 is moveably received in the inner sleeve 16 and is fixedly connected to a valve stem or linkage 19 leading to valve 13. Stem 19 extends through a bore 20 in flange 17 and through an intermediate plate 21 into valve housing 22 of valve 13, valve 13 being connected to electromagnet 12 by screws 21a one of which is shown in FIG. 1.

Intermediate plate 21 has a cylindrical recess 23 providing a free passage for valve stem 19. Recess 23 is of such dimensions that it can accommodate a holding system generally designated with reference numeral 24 and shown in greater detail in FIGS. 2 and 3. This system 24 comprises an annular carrier 25, a permanent magnet 26 made of sintered oxide and a cover plate 27 of non-conductive material. In order to fixedly mount the permanent magnet 26 on annular carrier 25, a bonding agent 32 in the form of a resin or the like is provided. As will be evident from FIG. 3 showing the encircled portion Z of FIG. 2, the annular carrier 25 is axially moveable between a shoulder 28 of valve stem 19 and a retainer or snap ring 29 provided in a corresponding groove 29a of valve stem 19. The size of the axial play can be selected in conformity with the specific circumstances and requirements and may be adapted to these circumstances if necessary for instance, by the provision of spacer discs. Retainer or snap ring 29 is concealed in a recess 30 of carrier 25.

OPERATION OF THE VALVE

In the starting position, armature 18 occupies its lowermost position in which the valve stem 19 connected to armature 18 is held in its valve closing position. If the valve is to be opened, electro-magnet 12 is energized shortly by a power source (not shown) whereupon armature 18 moves into a position shown in the drawing and in which the valve occupies its open position. In this instance, the magnetic forces of the electro-magnet and of the permanent magnet act in the same direction so that armature 18, the valve stem 19 and the system 24 are moved upwardly very fast. Once the armature 18, under the influence of the relatively short duration of the current in the electromagnet, has reached its upper-most position, system 24 holds the stem 19 and the armature in its upper-most position by itself. For purposes of returning the valve to its starting position, a current of opposite polarity is passed through magnet coil 15. The magnetic forces created in coil 15 counteract the magnetic forces of the permanent magnet 26 so that the system 24 becomes ineffective and armature 18 with valve stem 19 and system 24 return to the starting position.

The short current impulse effective during the first-mentioned energization of the magnetic system brings about a fast actuation of the valve in view of the addition of the magnetic forces of the electro-magnet and of the permanent magnet. However, the inertia of these moveable valve members is very large and would destroy the permanent magnet 26 in a very short period of time if it were not journaled on valve stem 19 with axial play designated by reference numeral 31. However, in view of the provision of this axial gap or play 31, the permanent magnet 26 impacts upon the flange 17 of electro magnet 12 only under the influence of its own inertia, and this inertia is, of course, considerably smaller than the total of the inertia of the moveable valve parts 18, 19 and 26. Consequently, permanent magnet 26 is safe from destruction by the forces created in the magnetic system.

If, for one reason or another, the system 24 has to be exchanged or has to be mounted on another electromagnetic valve, this can easily be effected in view of the detachable connection of the system 24 to valve stem 19, by simply removing retainer or snap ring 29.

What I claim is:

1. In an electromagnetically operable valve having a housing: an armature, a valve stem connected to the armature and axially moveable in the housing, and a permanent magnet mounted on said stem for holding the same in a certain position with respect to the housing, said permanent magnet having an axial play with respect to the valve stem to permit relative axial movement therebetween.

2. The combination of claim 1, which includes an annular carrier received on said stem with axial play and having fixedly mounted thereon said permanent magnet.

3. The combination of claim 2, wherein said stem is provided with a shoulder, and means detachably connected to said stem, said carrier being axially displaceably mounted on said stem between said shoulder and said connecting means.

4. The combination of claim 3, wherein said stem is provided with a groove and wherein said connecting means forms a snap ring received in said groove.

5. The combination of claim 3, wherein said carrier is provided with a recess concealingly receiving said connecting means.

6. The combination of claim 2, wherein said permanent magnet is fixedly connected to said annular carrier by a resin.

References Cited

UNITED STATES PATENTS 3,212,751  10/1965  Hassa.

ARNOLD ROSENTHAL, Primary Examiner

U.S. Cl. X.R.

251—129